United States Patent [19]

Maher et al.

[11] 4,192,698
[45] Mar. 11, 1980

[54] MAKING AN ELECTRODING INK FOR A MONOLITHIC CERAMIC CAPACITOR

[75] Inventors: John P. Maher, Adams; Robert T. Jacobsen, Williamstown, both of Mass.

[73] Assignee: Sprague Electric Company, North Adams, Mass.

[21] Appl. No.: 831,199

[22] Filed: Sep. 7, 1977

[51] Int. Cl.² .............................................. H01G 1/01
[52] U.S. Cl. ...................................... 156/89; 241/21; 241/46.15; 241/46.17
[58] Field of Search ................ 156/89; 241/15, 16, 241/46.08, 46.11, 46.15, 46.17, 21, 30; 252/62.9, 63.5; 428/539

[56] References Cited

U.S. PATENT DOCUMENTS

| 2,764,359 | 9/1956 | Szegvari | 241/46.15 |
| 3,090,567 | 5/1963 | Schafer et al. | 241/21 |
| 3,682,766 | 8/1972 | Maher | 428/539 |
| 3,917,487 | 11/1975 | Short | 428/539 |
| 3,995,815 | 12/1976 | Megelas | 241/46.15 |
| 4,082,906 | 4/1978 | Amin et al. | 156/59 |

OTHER PUBLICATIONS

NASA Report TN D-4862 "The Roll of Chemical Reactions in the Mechanism of Comminution of Ductile Metals into Ultrafine Powders", A. Arias (1962).
Electrochemical Society Series "Ultrafine Particles", Quatinetz et al., pp. 271-296, 1963.

Primary Examiner—Caleb Weston
Attorney, Agent, or Firm—Connolly and Hutz

[57] ABSTRACT

A smooth electroding ink containing a silver-alloy powder is prepared by milling and deagglomerating the silver-alloy powder in the same vehicle employed in the ink. This is accomplished at high production rates in a sand mill by establishing and maintaining during milling a splash-free laminar-flow vortex of the slurry, leading to very smooth buried silver-alloy electrode films in a monolithic ceramic capacitor.

9 Claims, 2 Drawing Figures

MAKING AN ELECTRODING INK FOR A MONOLITHIC CERAMIC CAPACITOR

BACKGROUND OF THE INVENTION

This invention relates to a method for preparing a smooth electroding ink containing silver alloy powder particles which ink is suitable for forming the internal electrode films of a monolithic ceramic capacitor.

Only in recent years have silver containing inks been used in the demanding role of precursors of the buried electrodes in monolithic ceramic capacitors. Such glass-ceramic capacitors are described in U.S. Pat. No. 3,682,766 issued Aug. 8, 1972 and assigned to the same assignee as the present invention.

When in a monolithic ceramic capacitor the roughness of an internal electrode film is commensurate with the thickness of an adjacent active dielectric layer, the capacitor tends to exhibit a low breakdown voltage and poor performance on life tests. More generally, in such capacitors with rough electrodes, the maximum volt-microfarad product of which it is capable is less than that possible based upon the inherent dielectric properties of the ceramic and the use of smooth electrodes. The thinner are the active dielectric layers, the smoother the electrodes must be for optimum capacitor performance.

Suitably smooth electroding inks containing silver are much more difficult to prepare than the more commonly used inks based upon other base or noble metals.

Fine silver powders may be produced either by a chemical or a ball milling method. The resulting fine metal powder is then removed from the chemical or milling liquid, dried, and dispersed in a suitable vehicle for forming an electroding ink. This dispersing step is usually carried out in a 3-roll mill.

It is further recognized that two competing processes normally occur during the milling of malleable metal particles, namely comminution (or deagglomeration) and welding. Silver containing metal surfaces will readily weld due to compaction of particles by the milling elements (e.g. balls). This leads to the creation of agglomerate particles tending to increase the average particle size of the very malleable and ductile silver powder.

Fine malleable base-metal flake is known to be produced by milling in a sand mill, which flake is particularly useful as a bright pigment in decorative paints. (Fine powders of the same metals, wherein the particles are spherical appear very dark or black). Sand mills employ small milling balls, for instance from 0.2 to 0.02 inch (0.5 to 0.05 cm) in diameter (equivalent to a volume less than about 0.07 ml.) while ball milling may be distinguished by typically employing milling balls having volumes greater than 0.07 ml. Sand milling is accomplished by means of a rotating impeller and normally involves a more vigorous agitation, compared to the relatively slow tumbling of the large balls in a ball milling method. Certain sand mills, having multiple or compound impellers designed for high speed comminution, are known as ATTRITOR mills (Trade Mark of Union Process Company). In the production of fine spherical malleable metal particles containing silver, sand milling has not heretofore been employed for deagglomerating silver containing powders since it is known that for the milling times required for effective deagglomeration, flake would be produced.

In monolithic capacitor manufacturing processes for building the alternate layers of green ceramic and electrode ink films to form a stack, essentially spherical metal particles are greatly preferred in the ink as opposed to flake e.g. to avoid trapping the electroding ink vehicle within a dense network of flakes during ink film drying and firing steps.

Known procedures for making electroding inks for use in monolithic ceramic capacitors include separating the finely ground metal from the milling vehicle and then drying and dispersing the comminuted powder in another vehicle suitable for making the electroding paste. Many factors come to bear upon the choice of the electroding ink vehicle. The electroding ink should possess the required rheological properties for screen printing. The chemical properties must insure compatability with the green and mature ceramic at high temperatures at which the stack of alternate ceramic and electrode films is fired. The absence of large particle agglomerates is essential for providing smooth electrode layers in monolithic capacitors. There are no known liquids that are effective as a ball or sand milling vehicle and that at the same time also lead directly to an electroding ink having the many above-noted desired qualities.

It is therefore an object of the present invention to provide a smooth silver-containing electroding ink by a process wherein one liquid is employed both as the comminuting vehicle and the ink vehicle.

It is also an object of this invention to provide a simplified process for making large quantities of an electroding ink wherein the conductive particles are essentially spherical silver alloy particles.

It is still a further object of this invention to provide a silver containing electroding ink suitable for making monolithic ceramic capacitors having thin active dielectric layers down to thicknesses less than 0.001 inch (0.0025 cm).

SUMMARY OF THE INVENTION

A method for preparing a smooth electroding ink for use in making a monolithic ceramic capacitor includes forming a mixture or slurry of a silver containing metal powder, milling elements and an organic vehicle. This mixture is milled by means of a rotating impeller. The impeller may be a rotating nautical screw or a perforated plate.

According to this invention, the metal powder amounts to from 65 to 95 percent of the sum of the metal plus the vehicle by weight, leading to a relatively viscous milling slurry. The milling is conducted in a non-violent mode so as to establish a splash free laminar flow in the slurry until a good texture is obtained and the fineness of grind of the metal powder is less than 8 microns, as measured using a standard ramp type fineness of grind gage. The conventional term "laminar flow" is based upon the concept of parallel adjacent sheets or layers within flowing liquids or gasses, which sheets move smoothly relative to each other without turbulence. Failure to establish or to maintain laminar-flow in the slurry during milling results in further agglomeration and flaking and ultimately produces unsatisfactory electroding ink.

The milling elements are removed from the milled mixture and an organic binder, such as ethyl cellulose, is blended into the mixture to obtain a screen printable ink having a viscosity of from 20,000 to 150,000 centipoise. The binder may advantageously serve to increase the viscosity of the ink and necessarily serves as a binder for maintaining the form of the screened and dried electroding ink layer in the steps for making a capacitor prior to firing. Additional vehicle may be added after milling if a lower viscosity is desired. A surfactant is included in the milling slurry as a dispersant and as an aid in milling.

It is recognized that in general, increasing the size of the milling balls or the size of the mill or the speed of rotation of a mill, will have the effect of increasing the impact forces exerted on the particles by the balls, which in the case of a malleable metal containing milling charge will tend to enhance agglomeration and the production of flake particles rather than the production of the more desirable spherical particles for a monolithic capacitor electroding ink. In particular, ball milling of malleable metals using large tumbling balls has been observed in small batches to produce spherical particles, e.g. 100 grams using a small milling container of 2 inches diameter. However, a scaling up by factors of ten or more results either in the requirement for very extensive ball milling times, e.g. 150 hours to achieve the desired particle comminution or is incapable of achieving the necessary comminution at all. Further, the particle shapes tend more and more toward the flake form as batch sizes, mill capacity and milling times increase.

Very large batches of electroding inks containing silver alloy particles may be "sand milled" by the method of this invention to an extremely smooth ink containing essentially spherical metal particles. Further, due to the greatly increased number of balls in the sand mill and hence collisions for a given total weight of the milling balls, the required milling time is relatively short reducing milling costs and production "through-put" times. Additionally the need for pre-mixing of the components can be eliminated in a vertical axis sand mill whereby the powders may be added to the liquid while the mill is operating.

The same vehicle that is employed in the milling mixture is employed as the vehicle in the screen printable electroding ink. This is preferably accomplished by choosing the vehicle from among organic vehicles that are known to serve well in a screenable electroding paste and employing the non-violent sand milling technique of this invention which is found to be surprisingly tolerant of the properties of the milling vehicle.

The method of this invention is relatively free of the many variables and need for the close controls and complex steps that characterize the conventional process for making silver-containing electroding inks, including that of control over the initial degree of agglomeration of the metal powder.

DESCRIPTION OF THE PREFERRED EMBODIMENTS

Figure 1:
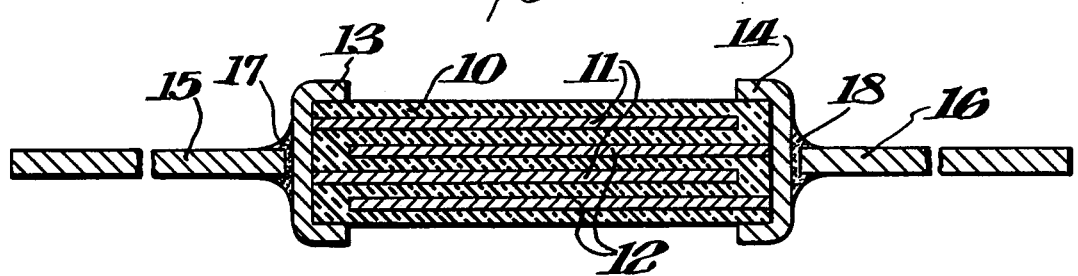
FIG. 1 shows in side sectional view a monolithic ceramic capacitor.

The monolithic ceramic capacitor shown in FIG. 1, has a glass-ceramic body 10. Buried within the body 10 are a set of electrode films 11 that are interleaved with and spaced from another set of electrode films 12. Conductive termination coatings 13 and 14 contact electrode sets 11 and 12, respectively. Lead wires 15 and 16 are attached by solder bonds 17 and 18 to terminations 13 and 14, respectively. The electrode films 11 and 12 are of a silver-palladium alloy.

The capacitor body with buried electrodes is made by screen printing a film of an electroding ink on a surface of each of a plurality of glass-ceramic green layers, making a stack of these layers to form the body and firing the body to mature the glass-ceramic and to transform the ink films into the metallic electrode films. Further details pertaining to the method used for making a glass-ceramic monolithic ceramic capacitor are disclosed in U.S. Pat. No. 4,027,209 issued May 31, 1977 and assigned to the same assignee as the present invention, and this patent is incorporated by reference herein.

Electroding inks for use in making such capacitors are described below, as well as novel and highly effective criteria for determining the suitability of such electroding inks for this use.

A fineness of grind gage (otherwise known as a drawdown gage) was used to determine the approximate size of the largest particles remaining in the milled ink of the following examples. Such gages consist of a calibrated shallow tapered or ramped trough, the ink being drawn across the trough by a doctor blade (ASTM method D1210-64). However, it has been found that the correlation is generally poor between maximum particle size, as determined by this fineness of grind method and the degree of electrode smoothness as determined by sectioning a completed capacitor and viewing the electrodes under a microscope. This may be explained by the fact that the scarce "largest particles" will statistically very unlikely appear in the very small field of the microscope. What is seen and may be measured in the microscope, represents the electrode surface smoothness determined by the great majority of the metal electrode particles excluding the "largest particles".

It was found that an accurate reliable measure of this texture or smoothness was obtained by depositing a thick film of the milled ink on a glass slide or other flat plate, drying the film for 15 minutes at 100° C. and inspecting the surface of the dried film using a standard (Zeiss) light-section-microscope. This instrument produces a thin sheet of intense light that is projected at a 45 degree angle onto the film surface. A microscope is arranged to view the illuminated surface portion from an opposite 45 degree angle (so as to be aligned with the reflected light sheet from a target surface that is mirror smooth).

Figure 2:
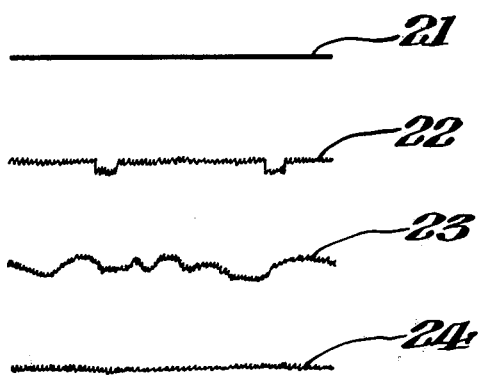
FIG. 2 illustrates light-section-microscope lines representing profiles of a blank glass slide and dried films of a prior art silver-alloy ink, a prior art noble metal ink, and an ink produced according to this invention; all as seen at 400× magnification.

The observer sees a substantially horizontal line that corresponds in profile to the texture of the film surface. In FIG. 2 there are illustrated such lines that were produced in a light-section-microscope of ink films at a magnification of 400×. The microscope employs a reticle having a horizontal line that is micrometer adjustable upward or downward. The technique used here to obtain a measure of texture quality includes positioning the reticle line so that it just touches the upper peaks of the illuminated profile, then lowering the reticle line so as to just touch the lowest peaks, and determining the difference in microns (peak to peak).

It has been found that for capacitor electrodes having an average thickness of about 2 microns or greater, this method for determining texture quality correlates very well with electrode smoothness as seen in a capacitor cross section which in turn correlates well with capacitor life test results. In Table I below, three grades of ink texture quality are shown that correspond to poor, fair and good performance criteria in finished capacitors. However, when there exist a few particles or agglomerates that are larger than about 8 microns, as measured by the fineness of grind gage, the life tests and other capacitor performance measures such as breakdown voltage are so poor that the ink texture quality test has no meaning when the ink is to be used in a capacitor having dielectric layers less thick than 0.0001 inch.

Table I

| Ink Texture Quality (microns) | Capacitor Quality |
|---|---|
| less than 6 | GOOD |
| 6–10 | FAIR |
| more than 10 | POOR |

The light section microscope profile of a plain glass slide is represented by the straight line 21 of FIG. 2. The thickness of reference line 21 was 1.5 microns as measured by the above described technique. Line 22 represents a very smooth conventional noble metal electrode (Pt/Au) having a measured texture quality of about 2 microns. What appears to be negative bumps are holes in the film.

The silver-palladium alloy powders employed here are typical of those that are commercially available. They have a characteristic effective surface area of about 30 square meters per milliliter (m²/ml), but are also highly agglomerated which agglomerates have diameters up to about 40 microns. It is generally preferred to employ silver containing powders having an effective surface area of greater than 1.5 m²/ml to minimize the necessary milling time. The effective surface area $A_e$ of an ideal powder of spherical particles all having the same diameter d in microns is $$A_e = (6/d) \text{ m}^2/\text{ml}.$$

The above noted conventional silver bearing inks, wherein the metal powder is dispersed in the vehicle by passing the slurry through a 3-roll mill one or more times, typically exhibit a fineness of grind greater than 8 microns and a texture ranging from 6 to 14. A light-section-microscope profile of such an ink, having been prepared by employing the same slurry composition as for Example 1 below, is illustrated in line 23 in FIG. 2. This ink had a fineness of grind of 9.5 microns and a texture quality of 8.8 microns.

Example 1

Terpineol 318, supplied by Hercules, Inc., Wilmington, Delaware, in the amount of 15,117 gm, and 754 gm of a surfactant were poured into a sand mill containing 54,360 grams of 1.5 mm Al₂O₃ spheres. The surfactant was a mixture of equal molar quantities of the mono- and di-phosphate esters of tridecyl alcohol ethoxylate. The sand mill was a covered, water jacketed tank 50 cm in diameter with a 40 cm diameter perforated disc rotor suspended 7 cm from the bottom. The vertical axis rotor was driven by a 15 hp motor. With the rotor turning at 350 rpm, 50,259 gm of metal powder was added. This powder was a mixture of two powders, one having 20 Ag/80 Pd alloy particles and the other having 95 Ag/5 Pd alloy particles. The composition of the powder mix is 70 Ag/30 Pd by weight. The rotor was stopped and the dry powder clinging to the tank sides, rotor supports and cover was swept into the liquid. The speed was raised to 600 rpm, the maximum speed attainable without splashing or any visible violent action, and run for 20 hours at a slurry temperature of 17° C. (63° F.). After passing the milled mixture through a 200 mesh sieve to remove the spheres, the ink had a fineness of grind of 2.8 microns and a texture quality of 3.5 microns, and a viscosity of 11,000 centipoise. No flaking was apparent.

It is convenient to dissolve ethyl cellulose in a quantity of the chosen organic vehicle, and add a sufficient quantity of this thickener-binder solution to bring the viscosity of the ink to within the desired range after milling. Ink viscosities of from 20,000 to 150,000 centipoise are generally suitable for screening.

Example 2

In another experiment, 75 grams of the 70 Ag/30 Pd powder, 1.13 grams of the mono- and di-phosphate esters of tridecyl alcohol ethoxylate, and 31 grams of an organic vehicle were mixed and milled for 3 hours in a sand mill employing a nautical screw type impeller. Five separate runs were made, each employing one of a diverse group of organic vehicles, namely dichlorotoluene, terpineol, cyclohexanol, kerosene, and monobutyl ether of dyethylene glycol. These vehicles are listed above in order of decreasing smoothness of the resulting ink, having texture quality measures of from about 2 to 5 microns. The ink quality as judged from such other factors as substrate wetability and rheology suitable for screen printing was highest for the mono-butyl ether and terpineol and less good for kerosene, cyclohexanol and dichlorotoluene, in that order. All of the resulting inks exhibited a fineness of grind less than 4 microns and there was no flaking.

Example 3

In further experiments following the procedure of Example 2 wherein terpineol was chosen for the vehicle, simple alloy powders were used in place of the 70 Ag/30 Pd alloy mixture of that example. The three metal powders consisted of the alloys 95 Ag/5 Pd, 70 Ag/30 Pd and 20 Ag/80 Pd, respectively. The three resulting inks were found to be suitably smooth, all having a fineness of grind of about 3 microns. Although not tried, it would be expected that pure silver powder would also yield an excellent electroding ink.

Example 4

A 75 kilogram slurry charge, having the same composition as in Example 1, was milled in the same sand mill but at 30° C. (86° F.). Even after 30 hours of milling the ink had a fineness of grind of 9 microns and slight flaking. Also, it was necessary to reduce the speed of the rotor to about 360 rpm to maintain a smooth non-violent vortex. It appears that 30° C. is about the maximum temperature at which the process of this example is capable of providing suitably smooth ink, although it is anticipated that the addition of the thickeners such as the aforementioned binder or an additional quantity of the metal powder will make it possible to increase the milling speed and improve the quality of the ink at higher temperatures. It is most convenient and preferred to maintain the slurry temperature at about 18° C. (65° F.).

Monolithic capacitors having active dielectric layers of 0.00095 inch thickness were made using the inks of Examples 1 and a 70 Ag/30 Pd ink made by conventional 3-roll milling in terpineol. These capacitors were otherwise all alike structurally, and exhibited about the same dissipation factor, capacitance and leakage current. The capacitors were designed for maximum rated operation at 50 volts.

Capacitors of both groups were subjected to accelerated life test conditions of 150° C. with 175 Vdc applied and leakage current of each was monitored periodically.

The capacitors of both groups exhibited less than the required maximum leakage current after 48 hours, following a standard life test criteria. Fifty percent of the capacitors employing the 3-roll-milled electroding ink failed at 500 hours, at which time all the capacitors employing the smooth electroding inks of this invention were still good. Fifty percent of the remaining capacitors failed after 900 hours.

What is claimed is:

1. A method for preparing a smooth electroding ink for use in making monolithic ceramic capacitors comprising: (a) forming a mixture of a metal powder selected from the group of silver and silver-palladium, milling elements, a surfactant and an organic vehicle, said metal amounting to from 65 to 95 percent of the sum of said metal plus said vehicle by weight; (b) milling said mixture in a non-violent mode, by means of a rotary impeller so as to establish a splash-free laminar flow, until said metal powder exhibits a fineness of grind of less than 8 microns and a surface of a dried sample film of said ink exhibits a peak to peak amplitude of less than 6 microns; (c) removing said milling elements from said milled mixture; and (d) blending into said mixture containing said vehicle an organic binder to obtain a screen printable electroding ink having a viscosity of from 20,000 to 150,000 centipoise.

2. The method of claim 1 wherein at the introduction of said metal powder to said mixture, the characteristic effective surface area of said powder is greater than 1.5 square meters per milliliter.

3. The method of claim 1 wherein said vehicle is selected from dichlorotoluene, terpineol, cyclohexanol, kerosene and mono-butyl ether of diethylene glycol.

4. The method of claim 1 wherein said surfactant consists essentially of a mixture of equal molar amounts of the monophosphate and diphosphate esters of tridecyl alcohol ethoxylate.

5. The method of claim 1 wherein said silver in said metal powder amounts to from 20 to 95 percent by weight.

6. The method of claim 1 wherein said blending of said binder into said mixture is accomplished prior to said removing of said milling elements.

7. The method of claim 1 wherein the temperature of said mixture during said milling is maintained below 30° C.

8. The method of claim 7 wherein the temperature of said mixture during said milling is maintained at about 18° C.

9. A method for making a monolithic ceramic capacitor including depositing a film of an electroding ink on a surface of each of a plurality of green ceramic layers having a thickness less than 0.001 inch, making a stack of said layers to form a body having a plurality of internal electroding ink films being spaced from each other by said ceramic layers and firing said body to mature said ceramic and to transform said ink films into metallic electrode films; wherein the improvement comprises preparing said electroding ink by (a) forming a mixture of a metal powder selected from the group of silver and silver-palladium, milling elements, a surfactant and an organic vehicle, said metal amounting to from 65 to 95 percent of the sum of said metal plus said vehicle by weight; (b) milling said mixture in a non-violent mode by means of a rotary impeller so as to establish a splash-free laminar flow until said metal powder exhibits a fineness of grind of less than 8 microns and a surface of a dried sample film of said ink exhibits a peak to peak amplitude of less than 6 microns; (c) removing said milling elements from said milled mixture; and (d) blending into said mixture containing said vehicle an organic binder to obtain a screen printable electroding ink having a viscosity of from 20,000 to 150,000 centipoise.

* * * * *